Dec. 1, 1953  S. KELLER  2,661,248
CONTROL SYSTEM FOR AUTOMATIC SINGLE-CHAMBER
COMPRESSED AIR BRAKES
Filed June 19, 1947  3 Sheets-Sheet 1

INVENTOR
SIEGFRIED KELLER
By Richard ...
attorneys

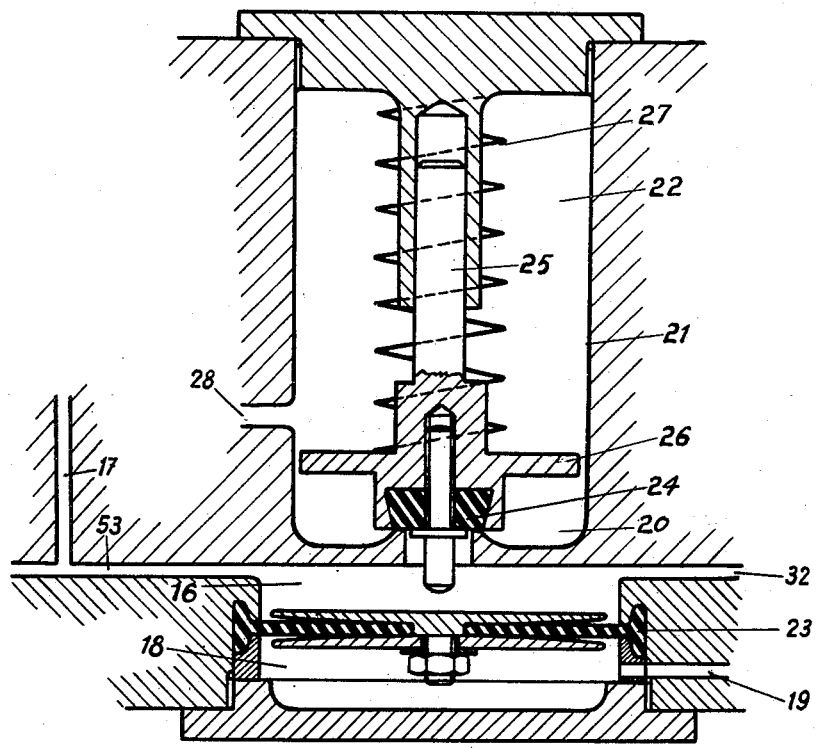

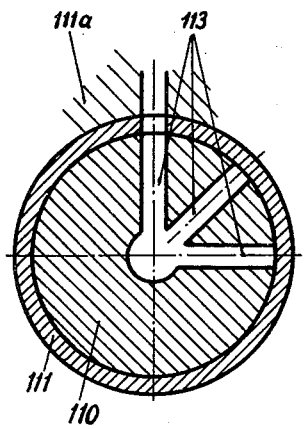
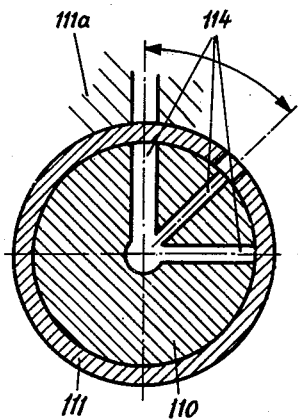
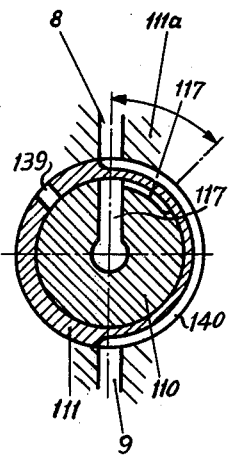
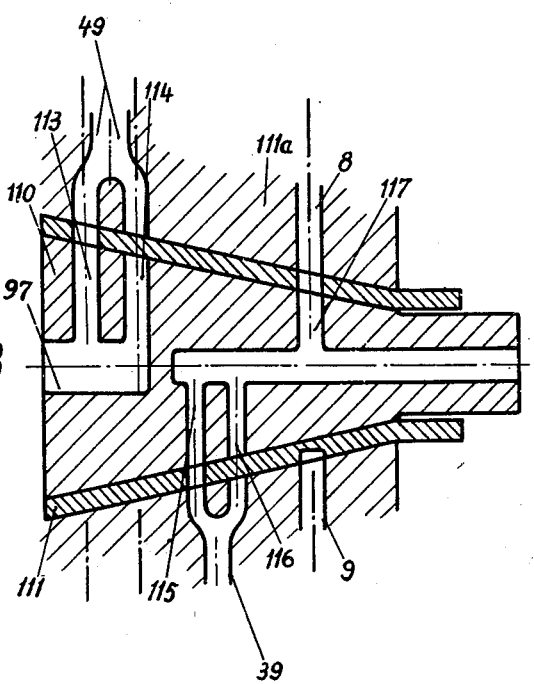

Patented Dec. 1, 1953

2,661,248

UNITED STATES PATENT OFFICE 2,661,248

CONTROL SYSTEM FOR AUTOMATIC SINGLE-CHAMBER COMPRESSED AIR BRAKES

Siegfried Keller, Effretikon, Switzerland, assignor to Machine Tool Works Oerlikon Administration Company, Zurich-Oerlikon, Switzerland, a Swiss company Application June 19, 1947, Serial No. 755,705

16 Claims. (Cl. 303—35)

1

The rapid developments in the field of rail transport and in particular the tendency to step up the travelling speeds of express trains, and to run an increasing number of express goods trains without increasing the distance apart of the "distant" signals, place increased demands on the braking equipment of the trains.

Therefore, the necessity for developing the automatic, compressed air brake in all its functions up to the limit of its capacity is becoming more and more apparent.

This is one of the main objects of the present invention.

It has for its more specific objects:

(a) To raise the transmission speed to the maximum value that can be practically achieved with compressed air brakes within the sensitivity limits hereinbefore set forth, this being effected independently of the nature of the braking, whether normal operational braking or rapid emergency braking is required;

(b) To increase the injection speed for normal operational braking and to obtain an injection speed which is independent of the nature of the braking;

(c) To keep constant the pressure drop which is produced automatically by the control system in the main air pipe for the first operational braking stage, independently of the volume of the main pipe from which draw-off is effected so that even the inclusion of a number of wagons which include only transmission pipes cannot essentially influence the pressure reduction;

(d) To keep constant, for all operational conditions, the injection pressure into the brake cylinder, independently of the main pipe draw-off volume;

(e) To keep constant the maximum pressure in the brake cylinder, independently of the piston stroke and of the volume of the auxiliary air reservoir;

(f) To adapt the braking to the load in goods wagons, or to produce a stronger brake application according to the speed in the case of the coaches of express trains, without the use of mechanical load interchangers or additional pressure transmitters in combination with a second brake cylinder and auxiliary air reservoir, so that, for example, the control system can produce two pressure stages, either by the movement of a lever in the case of goods wagons or by any known automatic speed-dependent change-over in the case of express train coaches, the same brake cylinder charging and discharging times holding good for both the pressure stages;

2

(g) To make the sizes of the charging passages, which are adjustable by changing the throttle bores, so large that even the largest brake cylinder can still be filled in a very short time;

(h) To reduce the time for the charging of the empty reservoirs.

With the above and other objects in view there is provided, according to the present invention, a control system for automatic single chamber compressed air brakes comprising a maximum pressure limiting device, an accelerator including a valve which is acted upon by the discharging main air, a draw-off restricting device including a valve having two elements which open and close alternately, a header unit including a valve which is acted upon by the auxiliary air pressure and by a spring pressure, a cut-off unit, a minimum pressure limiting unit, a charging unit and a triple pressure regulating unit for controlling the braking action, wherein these units are so combined and coordinated that on the one hand a rapid injection of the pressure fluid into the brake cylinder can be obtained and on the other hand the brake cylinder pressure can be varied in two stages the maximum values of which are limited, the variation taking place in dependence upon the pressure in the main air pipe, no that the said valve of the accelerator responds initially to the small pressure difference obtaining between the main air and the auxiliary air upon the initiation of a braking action, while at the instant that the said valve is opened by a member connected with it, it is acted upon by the discharging main air and is thereby held open, independently of the development of any further pressure difference between the main air and the auxiliary air, until the discharge of the main air is interrupted, which is done either by the draw-off restricting device, which device upon a definite pressure drop in the main air pipe closes as a result of the pressure difference obtaining between its main air and the control air, or by a discharge cut-off unit which cooperates with the draw-off restricting device and which, in the event of there being an insufficient pressure difference between the main air and the control air, closes after a predetermined time interval as a result of the static pressure of the discharging main air itself, whereby the minimum pressure limiting unit is opened by a sudden static pressure which is produced by the discharging main air, which pressure, during the flow of air, reaches a value which is greater than the pressure difference obtaining between the main air and the auxiliary air, and which also rises to the full main pipe pressure after the interruption of the main air draw-off by the action of the draw-off restricting device and the opening of the said valve thereof, whereby the commencement of the injection of the auxiliary air into the brake cylinder by way of the header unit coincides practically without delay with the response of the accelerator, and whereby the connection between main air pipe, the auxiliary air reservoir and the control air reservoir, as well as the connection of these reservoirs with each other, is interrupted by the cut-off unit as a result of a static pressure which is produced by the auxiliary air in one chamber operating against a static pressure in another chamber, which static pressure, during the duration of the injection, is greater than the pressure obtaining in the brake cylinder, and the interruption of the said connection being maintained after the desired injection pressure in the brake cylinder has been reached by the action of this pressure.

One form of such a control system will be described, by way of example, with reference to the accompanying drawings, in which:

Fig. 2 is a cross-section showing a valve assembly to a larger scale;

Fig. 3 is a section through the setting valve.

Figs. 4, 5 and 6 are sections along lines IV—IV, V—V and VI—VI of Fig. 3.

Figure 1:
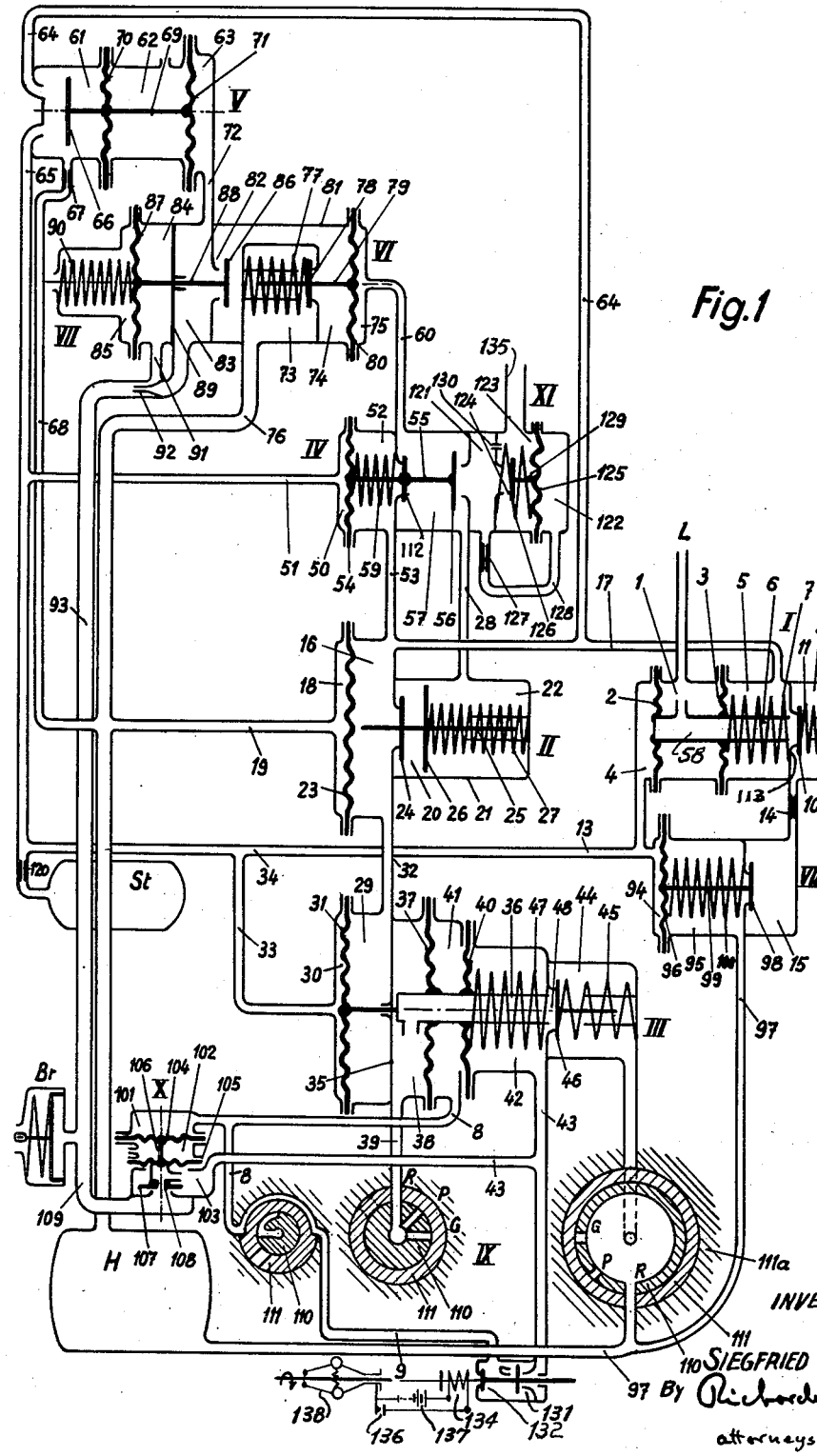
Fig. 1 shows diagrammatically the arrangement of the valves, pipes and other elements of the system.

The air-control system comprises a number of chambers, reservoirs, valves and pipes, which are combined into units according to their function. These units include a maximum pressure limiter I, an accelerator II, a triple-pressure regulator III, a draw-off restricting device IV, a cut-off unit V, a header unit VI, a minimum pressure unit VII, a charging unit VIII, a setting valve IX, a brake cylinder charging time control X, a discharge interrupter XI, an auxiliary air reservoir H, a control-air reservoir St and a brake cylinder Br. These units are connected with one another by suitable pipes. In the following description those parts of the system which can be considered as units will first be described.

The maximum pressure limiter I consists of a chamber I which is connected to the main compressed air supply pipe L and which is separated from two chambers 4 and 5 by means of diaphragms 2 and 3. The chambers I and 5 are connected with one another through a passage 58 formed in a valve rod 6 which is connected with the diaphragms 2 and 3 and which transmits to the latter the pressure of a spring 7.

A fixed valve seat 113 together with a movable valve body 10 form a seal between the chamber 5 and a further chamber 12. This valve is acted on by a spring 11. Thus, during charging, compressed air from the pipe L can pass to the chamber 5 through the passage 58 in the valve rod 6. The chamber 4 is connected to a pipe 13 and is acted upon by pressure in the control reservoir through this pipe, as will appear more clearly hereinafter. The chamber 12 is connected through a throttling passage 14 with the chamber 15 of the charging unit VIII. The function of this and of the other units will be described later in connection with the operation of the complete control system.

The accelerator II (see also Figure 2) consists of a chamber 16 which is connected by way of a pipe 17 with the chamber 5, a chamber 18 which is connected to the auxiliary air pipe 19, a small chamber 20, a cylinder 21 and a chamber 22. The chamber 16 is separated from the chamber 18 by a diaphragm 23. The seal between the chambers 18 and 20 is effected by a valve 24, which is rigidly connected with a piston 26 and a valve rod 25 and which is acted upon by a spring 27. There is no rigid connection between the valve rod 25 and the diaphragm 23, so that the movements of the diaphragm 23 can only act in one direction on the valve rod 25. The chambers 20 and 22 are separated from one another by means of a piston 26, except that there is a permanent annular clearance space between the piston 26 and the cylinder 21. The chamber 22 is connected by means of a pipe 28 with the draw-off restricting device IV.

The triple-pressure regulator III comprises two chambers 29 and 30, which are separated from one another by a diaphragm 31. The chamber 29 is connected through a pipe 32 with the chamber 16 and is under the influence of the air in the main compressed air supply pipe L through the pipe 17 and the maximum pressure limiter I, whilst the chamber 30 is under the influence of the control air acting through pipes 33 and 34. The diaphragm 31 is connected through a gland in the dividing wall 35 with a valve rod 36 which is formed with an axial bore. Between the wall 35 and a further diaphragm 37, there is the space 38, which may be connected to atmosphere through a pipe 39 under the control of the setting valve IX. The bore of the valve rod 36 opens into the chamber 38.

The diaphragm 37 and another diaphragm 40 are connected with the valve rod 36. Above the diaphragm 37 is the chamber 41 which is connected either with the chamber 42 above the diaphragm 40 or to atmosphere. A pipe 43 leads from the chamber 42 to a speed-controlled unit U and through the charging time control unit X to the brake cylinder Br. The valve rod 36 and the diaphragms 40, 37 and 31 connected therewith are acted upon by a spring 47 which maintains a gap 48 through which the bore in the valve rod 36 communicates with the chamber 42. The chamber 44 above the chamber 42 is separated from the latter by a valve 46 which is acted upon by a spring 45. The chamber 44 is connected with the auxiliary air reservoir H by the pipe 49, the setting valve IX, and the pipe 97.

The draw-off restricting device IV comprises a chamber 50 which is connected with a control air pipe 51. Above the chamber 50 is a chamber 52 which is connected with the chamber 16 of the accelerator II by means of a pipe 53. The chamber 50 is separated from the chamber 52 by a diaphragm 54 which is under the action of a spring 59. Connected with the diaphragm 54 is a valve rod 55 which carries two valve bodies 56 and 112.

The chambers 52 and 57 are separated from each other by the lower valve body 112. The port controlled by the upper valve body 56 leads to atmosphere, as will be later described, through the space 121 of the discharge cut-off unit XI. The chamber 57 is connected by a pipe 60 with the header unit VI and by the pipe 28 with the chamber 22 of the accelerator II.

The cut-off unit V comprises three chambers 61, 62 and 63. Into the chamber 61 there opens a pipe 64 which is connected with the compressed air supply pipe L through the pipe 17 and the maximum pressure limiter I.

The control air pipe 65 leads from the chamber 61 and is opened or closed simultaneously with the pipe 64 by the valve 66. An auxiliary air pipe 68 branches off from the chamber 61 through the sensitivity passage 67. The valve 66 is connected with the diaphragms 70 and 71 by means of a valve rod 69. The chamber 62 between these two diaphragms communicates with atmosphere. The chamber 63 communicates through the pipe 72 with the minimum pressure unit VII.

The header unit VI comprises the chambers 73, 74 and 75. The chamber 73 is connected through a pipe 76 with the auxiliary air reservoir H and is shut off from the chamber 74 by the valve 78 which is under the pressure of a spring 77. The chambers 74 and 75 are separated from one another by a diaphragm 80, which is connected with the valve 78 by means of a valve rod 79. The chamber 74 is connected with the chamber 82 of the minimum pressure unit VII by a pipe 81.

The minimum pressure unit VII comprises the chambers 82, 83 and 84 and the chamber 85 which communicates with atmosphere. The chamber 84 is separated from the chamber 85 by a diaphragm 87. A valve rod 88 is connected with the diaphragm 87. This rod passes through the dividing wall 89 into the chamber 83 and carries a valve 86. The latter is held in the open position by the pressure of a spring 90. The chamber 84 is connected by a pipe 91 with a Venturi nozzle 92, which is inserted in the brake cylinder pipe 93 and produces a negative pressure in the chamber 84 during the flow of the air.

The charging unit VIII comprises chambers 94, 95 and 15. The chamber 94, which is separated from the chamber 95 by a diaphragm 96, is subjected to the pressure of the control air through the pipes 13 and 34. The chamber 95 is connected by a pipe 97 with the auxiliary air reservoir H. The chambers 15 and 95 are separated from one another by a valve plate 98. The valve plate 98 is connected with the diaphragm 96 by means of a valve rod 99 and is acted up by a spring 100. The charging unit VIII communicates with the chamber 12 of the maximum pressure limiter I by way of the throttling passage 14.

The setting valve IX, which is shown in detail in Figures 1, 3, 4, 5 and 6 comprises an inner friction cone 110, in which are formed two separate axially-spaced sets of charging passages 113 and 114 and discharging passages 115 and 116 respectively, which correspond to the different charging and discharging times required with different types of brakes (such as on goods trains, ordinary passenger trains and express trains). Axially spaced from these passages it is formed with a groove 117, which is connected with atmosphere. The setting valve also comprises an outer friction cone 111 which is rotatably mounted in the housing 111a of the device, which cone 111 actuates in a first position the charging passages 113 and the discharging passages 115 and in a second position interrupts this connection and opens the charging passages 114 and the discharging passages 116. The outer cone 111 also has a bore 139 through which the conduit 8 is connected with the bore 117 in the inner cone 110, as well as a groove 140 by means of which the conduits 8 and 9 may be connected with each other. In the first position the chamber 41 is connected with the atmosphere through the conduit 8 and the bores 139 and 117, while the connection of the conduits 8 and 9 through the groove 140 is interrupted. On the other hand, in the second position, the connection of the conduit 8 with the bore 117 is interrupted, while the chamber 41 is connected through the groove 140 and the conduit 9 with the speed regulator U. The unit U includes two valves 131 and 132 which are operated jointly by means of the valve rod 133. A magnetic winding 134 is included in a circuit which contains a contact 136 and a battery 137, the contact 136 being actuated by a centrifugal regulator 138. At small speed the contact 136 is open, so that the magnetic winding 134 will not be energized. Then the valve rod 133 is situated in the position shown in the drawing, wherein the valve 131 is open while the valve 132 is closed and the conduits 9 and 43 are interconnected. At high speeds, on the other hand, the valve 131 is closed and the valve 132 is open, so that the connection of the conduits 43 and 9 is interrupted. Furthermore, the conduit 9 is connected with the atmosphere through the valve 132. Thus by means of the inner friction cone 110 the device can be set depending upon the type of train, namely, whether it is a goods train "G," passenger "P," or express "S," while by means of the outer friction cone 111 it is possible to set different braking pressure stages. When the outer cone 111 is located in the aforesaid second position, in which the lower pressure stage is operable, the upper pressure stage becomes effective at great speed by energizing the magnet winding 134, in that the chamber 41 is discharged through the conduit 8, the groove 140, the conduit 9 and the valve 132.

The unit X for limiting the charging time of the brake cylinder comprises chambers 101, 102, 103 which are separated from one another by means of diaphragms 104 and 105. The chamber 102 is permanently connected with atmosphere. The two diaphragms are connected together by a valve rod 106 which extends beyond the diaphragm 105 in the form of a tube. The end of this tube has the form of a valve seat 107 provided with a restriction passage 108 and having an opening toward the chamber 103. When the valve is closed, the brake air flowing from the triple-pressure regulator III by way of the pipe 43 can only flow to the brake cylinder Br through the valve rod 106 and through the throttling passage 108 in the valve plate 107 by way of the pipe 109.

The discharge cut-off unit XI consists of a chamber 121, which is connected on the one hand with a compression chamber 122 through a throttling passage 127 and a pipe 128 and is connected on the other hand, by way of a valve 124, with a space 123 which is open to atmosphere. The valve 124 prevents to a small extent in its open position the free flow of compressed air from the chamber 121 to the atmosphere and thus produces a baffle effect in that chamber. Connected in parallel with the valve 124 is a small, permanently opened air-discharge passage 130. The passage 130 is required to provide an outflow into the atmosphere of the compressed air from the chamber 122 through the pipe 128 and the opening of the passage 130 after the closing of the valve 124. The compression chamber 122 is separated from the chamber 123 which is connected with atmosphere through the pipe 135, by a diaphragm 125. This diaphragm is connected by means of a valve rod 129 with the valve 124 and is under the action of a spring 126.

The units just described may be arranged in one or more housings, according to the space available on the wagon or locomotive. The sequence of operations during the charging of the empty reservoirs, during braking and during the releasing of the brakes will now be described.

The charging of the empty reservoirs is effected as follows: The compressed air from the main air pipe L enters the chamber 1 of the maximum pressure limiter I and from this chamber passes through the hollow valve rod 3 into the chamber 5. Hence it passes through the pipes 17 and 64 into the chamber 61 of the cut-off unit V. Owing to the pressure thus exerted on the diaphragm 70, the valve 66 is lifted from its seating. The air can now flow through the pipe 65 to the control reservoir St, to which is connected a throttling passage 120, so that practically the unthrottled main pipe pressure is obtained in the pipe 65 and in the control chambers 50, 30, 94 and 4 which are connected with it by means of the pipes 51, 34, 33 and 13.

From the chamber 61 the compressed air also flows through the sensitivity passage 67 and the pipe 68 to the auxiliary air reservoir H. Because of the throttling caused by the said passage 67, the pressure in the auxiliary air part of the control system is less than that in those control chambers which are connected in front of the throttling passage 120 of the control reservoir St.

As a result, the diaphragm 96 of the charging unit VIII lifts the valve 98 against the pressure of the spring 100 and thus produces a connection between the chambers 15 and 95, whereby the pressure in the chambers 12 and 15 is reduced to the pressure in the auxiliary air reservoir H. The compressed air coming from the pipe L can now also lift the valve 10 against the action of the spring 11 and can flow into the auxiliary air reservoir by way of the throttling passage 14, the chamber 15 and the pipe 97. In this way, the time for the initial charging is greatly reduced, so that the object set forth at (h) in the opening part of this specification is achieved.

The spring 100 of the charging unit VIII is so adjusted that this valve closes as soon as the auxiliary pressure is about 0.2 kg./cm.² lower than the control pressure. The rest of the charging thereupon takes place solely by way of the sensitivity passage 67 of the cut-off unit V.

The main air also flows into the chamber 16 of the accelerator II by way of the pipe 17, and into the chamber 52 of the draw-off control unit IV and the chamber 29 of the triple-pressure regulator III by way of the pipes 53 and 32, respectively. The auxiliary air reaches the chamber 44 of the triple-pressure regulator III by way of the valve IX and the pipe 49, while the passage of the air from the chamber 44 into the chamber 42 and thus into the brake cylinder is prevented by the valve 46 which is in the closed position. The auxiliary air reaches the chamber 18 of the accelerator II through the pipe 19 and reaches the chamber 73 of the header unit VI by way of the pipe 76. Further passage of the air to the brake cylinder is prevented by the valve 78.

If the reservoirs and chambers should be momentarily overloaded by too high a pipe pressure during the initial stages, an independent equalisation of pressure takes place through the valve 66 of the open cut-off unit V, until the same pressure obtains, upon completion of the charging, in all reservoirs and in the chambers connected therewith. In this connection, the following are evacuated: the brake cylinder Br (through the pipe 109, chamber 103, pipe 43, chamber 42, the hollow valve rod 36, the chamber 38 of the triple-pressure regulator III, the pipe 39 and the corresponding discharge passage of the setting valve IX which leads to atmosphere), the chamber 63 of the shut-off unit V, the chamber 83 of the minimum pressure unit VII and the chamber 74 of the header unit VI (which is connected by way of chamber 83 and pipe 93 with the brake cylinder, which is evacuated in the manner already set forth). The chambers 20 and 22 of the accelerator II, the chamber 57 of the draw-off control unit IV and the chamber 75 of the header unit VI connected therewith are connected with atmosphere through the open valve 56 of the draw-off control unit IV. All the chambers of the discharge cut-off unit XI are also evacuated.

Braking takes place in the following manner: If the necessary pressure drop for initiating the braking is produced in the main pipe L by hand or by mechanical means, the main pipe pressure in the chamber 16 of the accelerator II, owing to the action of the sensitivity passage 67 in the sensitivity unit V, drops somewhat more quickly than does the auxiliary air pressure in the opposing chamber 18, whereupon the diaphragm 23 lifts the valve 24 (Figure 2) from its seat in known manner. Thus the main air can suddenly discharge to atmosphere through the chambers 20 and 22 of the accelerator II, through the very small chamber 57 of the draw-off control unit IV and through the valves 56 and 124. As already stated, the valve 124 prevents in its open position the compressed air from freely flowing to the atmosphere and thus produces a baffle effect in the chamber 121. The valve 112 operates in the same manner so long as it is open so that a baffle effect is also created in the chamber 57. In this way, there is momentarily produced, at the commencement of the draw-off, a very high static pressure in the small baffle chamber 57 which is connected with the chamber 75 of the header unit VI, the latter chamber also being very small. Under this static pressure, the diaphragm 80 suddenly opens the valve 78, whereupon the auxiliary air can flow very rapidly and with little resistance into the brake cylinder Br by way of the chamber 74 and pipe 81 and through the minimum pressure unit VII.

If the desired header pressure is reached for the application of the brake shoe, then the valve 86 closes, because of the charging pressure on the diaphragm 87, against the action of the compression spring 90. The connection of the auxiliary air reservoir to the brake cylinder by way of the pipe 93 is thus interrupted. With the opening of the header unit, a substantially higher static pressure is formed in the very small baffle chamber 83 of the minimum pressure unit VII, during the period of flow, as compared with the pressure in the brake cylinder, and this static pressure is transmitted through the pipe 72 to the chamber 63 of the cut-off unit V, whereupon the diaphragm 71 suddenly forces the valve 66 on to its seating. This interrupts the connection between the main air pipe 64 and the auxiliary air reservoir H and the control air reservoir St and also interrupts the connection between the pipes and chambers connected thereto.

Actually the operations described above in separate stages take place very quickly, so that the application of the brake shoe and interruption of the connection between the individual reservoirs practically coincides with the beginning of the draw-off through the accelerator. Thus in practice, even though the sensitivity passages 67 and 126 are relatively large no air can flow back into the main air pipe.

These first operations are initiated immediately and independently of the nature of the braking that is required, from the minimum operational braking to emergency braking, because they are directly caused by the static pressure of the discharging main air. Thus the objects (a) and (b) are achieved.

Immediately upon the response of the accelerator II, the pressure changes in the main air parts of the system and in the auxiliary air parts can continue completely independently of one another. In particular, the draw-off from the main air pipe by way of the draw-off control unit IV continues irrespectively of the volume of the main pipe, which volume depends on the number of pipes connected, until the main air pipe pressure has fallen to the value required for the first stage of the braking. Then the pressure difference occurring between the chamber 50, which is in communication with the control reservoir St, and the chamber 52, which is in communication with the main air pipe, overcomes the spring 59. The upper valve body 112 is forced on to its seat and the connection of the main air pipe with the surrounding air is interrupted.

The independence of the changes in the pressures of the main and auxiliary is obtained by the novel accelerator construction as shown in Figure 2. The valve of the accelerator II is constructed as a very small, light piston 26 which moves with the minimum of friction in the bore of the cylinder 21, there being an annular air-space which has a definite relationship to the cross-section or flow area of the valve opening.

At the moment that the draw-off from the chamber 16 and the main pipe connected therewith begins, a momentary high static pressure is formed in the very small chamber 20, whereby the piston 27 is raised to the height of the discharge opening 28. The piston remains oscillating in this position so long as the discharge through the open valve 56 of the draw-off unit IV and the open valve 124 of the discharge cut-off unit XI continues, this being completely independent of the further development of the pressure in the chambers 16 and 18 of the accelerator II. The object (c) mentioned in the earlier part of this specification is thus achieved.

The cross-sectional area of the valve 78 of the header unit VI may thus even be made so large that the pressure drop in the auxiliary air reservoir proceeds in advance of that in the main pipe without thereby interrupting the draw-off, since in this case the valve rod 25 of the accelerator II cannot follow the downward movement of the diaphragm 23. However, as soon as the flow is interrupted by the correct closing of the upper valve 56 of the draw-off unit IV, the spring 27 forces the oscillating piston 26 back again and thus forces the valve 24 on to its seat.

In the opposite case, i. e., when the main pipe volume to be drawn-off is small in comparison with the header volume of the brake cylinder and therefore the discharge from the main pipe has finished before the header pressure in the brake cylinder has reached the prescribed value, the full main pipe pressure is produced in the chamber 57 of the draw-off unit IV and in the chamber 75 of the header unit VI which is connected therewith by way of the pipe 60, because of the connection of the chamber 57 with the chamber 52 by way of the lower valve 55, which is now lifted. Under this pressure on the diaphragm 80, the valve 78 is still held in the open position, so that the charging can continue until it is in due course interrupted by the operation of the minimum pressure unit VII. In this manner, the object (d) is achieved.

In order to prevent the minimum pressure unit VII from being prematurely cut off by the static pressure obtaining in the control system, which pressure is relatively high in comparison with the brake cylinder pressure, the chamber 84 is connected with a baffle nozzle 92 which is in the braking air passage and produces a negative relative pressure. So long as the flow continues (due to the movement of the brake piston until the application of the brake shoe), a smaller pressure obtains in the chamber 84 than in the brake cylinder.

At the instant the movement of the brake piston ends, a back pressure is produced in the pipe 93, whereupon the pressure in the chamber 84 rises suddenly, the diaphragm 87 overcomes the spring 90 and thus brings the valve 86 to its closed position. At this moment of the interruption of the flow, the pressure in the small chambers 82 and 74 rises immediately up to the pressure in the auxiliary air reservoir, whereby the diaphragm 80 is forced upwardly and the valve 78 also returns to its closed position under the action of the spring 77. The area of the valve 86, which is now under its auxiliary air pressure, is so chosen that the spring 90 is only capable of opening again when the brake cylinder pressure has sunk below about 0.3 kg./cm.$^2$, i. e., only upon complete release of the brake.

Unaffected by the charging action, the triple-pressure regulating unit III has moved to the cut-off position, because of the pressure difference between the chamber 30, which is under the control pressure, and the chamber 29, which is under main pipe pressure. Upon a further pressure drop in the main air chamber 29, the valve 46 is lifted, whereupon further compressed air from the auxiliary air reservoir H can flow to the brake cylinder Br by way of corresponding charging bores in the setting valve IX and through the pipe 49, the chambers 44 and 42, the pipe 43, the chamber 103 and the pipe 109. The brake cylinder pressure produced in the chambers 42 or 41 counteracts the pressure difference obtaining between the chambers 29 and 30, and thus it is possible, in known manner, to produce any desired braking or releasing stages by varying the main pipe pressure.

By the selective inclusion of the chambers 42 or 41, the effective cross-sections of which are different, the brake cylinder pressure which corresponds to a given main pipe pressure may be made larger or smaller. The inclusion or by-passing of the chambers is effected through the special setting valve IX, by the action of which suitable larger or smaller charging and discharging passages, which may be interchangeable as desired, are simultaneously connected in the system, with the object of keeping the brake cylinder charging or discharging times for the positions G, P and S the same for both pressure stages. This arrangement allows goods waggons, both in normal goods trains and also in express goods trains, to be braked to varying degrees, whether empty or loaded, using position P, or express goods trains to be braked to varying degrees in dependence upon the travelling speed, without using a mechanical load change over in the case of goods waggons or using a second brake cylinder or a special pressure transmitter in the case of express trains.

The flow area of the triple pressure regulator valve 46 for the charging of the brake cylinder in the position S is sufficient to ensure that even the largest brake cylinder is charged up to the maximum pressure in the prescribed minimum time. The special unit X for limiting the charging time of the brake cylinder also provides, as hereinafter set forth, for the automatic introduction of a smaller charging passage for the emergency braking of an express train at a speed below the speed range which is operative for normal quick braking.

Thus, for example, if by the action of the speed-controlled change-over valve U, the chamber 41 of the triple-pressure regulator is evacuated, i. e., the high pressure stage is introduced, then the space 101 of the charging time control unit X is also evacuated. The brake pressure acting in the chamber 103 on the diaphragm 105 lifts the valve 107 from its seat, thus allowing the free flow of the compressed air coming from the triple-pressure regulator III by way of pipe 43 but only through the corresponding charging bore in the setting valve IX.

However, if the low pressure stage is introduced, the brake pressure also occurs in the chamber 101, whereupon the diaphragm 104, which has a larger effective area, overcomes the pressure exerted by the opposing diaphragm 105. The valve 107 is thus forced on to its seat, whereupon the compressed air may only flow to the brake cylinder by way of the correspondingly smaller charging passage 108 of the valve 107, so that the lower pressure is reached in the same time as the higher pressure. In this manner, the objects (f) and (g) are achieved.

In order to limit the brake cylinder maximum pressure to the permissible value for every contingency likely to occur, and in order to obtain this substantially independently of the stroke of the brake piston and of the volume of the auxiliary air reservoir, that part of the control system which is under the main air pressure is connected to the main air pipe L by way of the maximum pressure-limiting unit I. As soon as the pressure drop in the main pipe becomes greater than is necessary for producing a full application of the brake, e. g., greater than 1.5 kg./cm.$^2$, whether it be by a slow lowering of pressure or as a result of a quick application of the brake, then the maximum pressure limiter I interrupts the connection with the main pipe L in that the pressure difference forming between the chambers 1 and 4 overcomes the spring 7, whereupon the hollow valve rod 6 is forced against the valve 10 and so interrupts the connection between the main air pipe and the remaining part of the air-control system.

Should it happen that, because of a quick application of the brake or because of slight leakages in the main air part of the control system, the pressure in the chamber 5 sinks to below the permissible value, e. g., below 3.5 kg./cm.$^2$, then the pressure difference between the chambers 5 and 4' further increases, whereupon the valve 10 is lifted and immediately there takes place a charging action from the auxiliary air reservoir H by way of the valve 98 (which is now open because of the lowered auxiliary air pressure) of the charging unit VIII.

Conversely, if the maximum pressure limiter allows too high a pressure to develop in the chamber 5 and thus in the other chambers connected therewith, the valve rod 6 is retracted from the valve 10 under the action of the diaphragm 3 and the spring 7, whereupon the excess pressure is immediately released through the pipe L and through the bore in the valve rod 6. In the event of a leaky brake cylinder, the valve 48 is lifted by the valve rod 36 because of the pressure drop in the chambers 41 or 42 of the triple-pressure regulator, whereupon there is a continuous flow from the auxiliary air reservoir of that amount of compressed air which is necessary for maintaining the brake cylinder pressure. If, as a result of this discharge, the pressure in the auxiliary air reservoir sinks below the pressure in the main pipe L, then the valve 10 of the maximum pressure limiter I opens, and the auxiliary air reservoir is fed by way of the passage 14, the chamber 15 of the open charging unit VIII and the pipe 97. In this manner, object (e) is achieved.

The discharge cut-off unit XI is provided to cover, for example, trains in which there is an excessive leakage in the coupling elements of the main air pipe or the breakage of the air control system during shunting, in which cases the discharge by way of the draw-off limiter IV cannot be interrupted in the manner described, because of the pressure regulator of the driver's brake valve continuously supplying as much compressed air into the main pipe as is passed out by way of the accelerator; in other words, the pressure difference between the main air chamber 52 and the control chamber 50, which is necessary for cutting-off of the draw-off limiting unit IV is not obtained.

In this case, the pressure chamber 122 is charged, by way of throttle passage 127 and the pipe 128 from the chamber 121, which is under the pressure of the discharging main air. The time taken to charge up to the static pressure is, in this case, an exact function of the ratio between the volume of the pressure chamber 122 and the cross-section of the throttle passage 127.

If the pressure in the pressure chamber 122 exceeds a certain value, then the diaphragm 125 overcomes the force of the spring 126, whereupon the valve 124 closes. Owing to the interruption of the flow, the pressures above and below the piston 26 of the accelerator II are immediately balanced, whereupon the valve 24 is again closed by the action of the spring 27. The compressed air can now again escape from the chamber 122 to atmosphere by way of the pipe 128, the throttle passage 127, the static chamber 121 and the air-escape passage 130. The valve 124 thereupon opens again and the air control system is again ready for operation.

The charging time for the pressure chamber 122 is advantageously so selected that with goods trains, for example, the volume of 15 to 20 leading unbraked waggons can be drawn off from a single air control system for the first operational braking stage before the discharge cut-off unit XI functions, whereas this time interval can be made shorter with passenger trains.

Instead of the spring 126, it is also possible for a static pressure to be used to apply pressure to the diaphragm 125, such static pressure being preferably adjustable in accordance with the ratio between the cross-sectional areas of the valve 124 and the discharge opening leading to atmosphere.

The release of the brake takes place in the following manner: If the pressure in the main air pipe L, and thus also in the chamber 29 of the triple-pressure regulating unit III, increases, then the hollow valve rod 36 moves downwardly, whereupon compressed air from the brake cylinder Br passes into the chamber 38 and pipe 39 by way of the pipe 109, chamber 103, pipe 43 and the hollow valve rod 36; it then escapes to atmosphere by way of the corresponding release or discharge bore of the setting valve IX.

If the pressure rise in the main air pipe is interrupted before the normal operating pressure is reached, then the eventual brake pressure is set at a lower value corresponding to the new main pipe pressure. In this way, the brake may be released in stages in known manner.

If the releasing of the brake takes place after a quick application of the brake, in which the maximum pressure limiting unit I has been in operation, then first of all the connection through the hollow valve rod 6 is again produced by the action of the pressure rise, whereupon the release operation proceeds as previously described. If, during the release, the main air pressure rises to a definite amount above the auxiliary air pressure, then the valve 10 is lifted against the spring 11, whereupon air from the main pipe L can flow into the auxiliary air reservoir H by way of the charging unit VIII and the pipe 97. The unit VIII is so adjusted that it closes as soon as the auxiliary air pressure has reached a value within about 0.2 kg./cm.$^2$ of the control pressure, thus rendering further charging impossible, even with high and long charging impulses.

As soon as the main pipe pressure has reached the value (e. g., 4.6 kg./cm.$^2$) required for the first braking stage, the upper valve 56 of the draw-off limiting unit IV opens under the action of the spring 59 and thus evacuates the air from the chambers 57, 22 and 20 of the accelerator II, as well as from the chamber 75 of the header unit VI. If the main pipe pressure rises still further, then the brake pressure sinks even more because of the action of the triple-pressure regulating unit III until finally, with a brake cylinder pressure of about 0.3 kg./cm.$^2$, the auxiliary air pressure on the diaphragm 70 of the cut-off unit V overcomes the brake cylinder pressure on the larger opposing diaphragm 71, whereupon the valve 66 is lifted from its seat, a connection between the reservoirs again being produced, whereupon the brake is completely released.

The auxiliary air reservoir may now be completely charged by way of the sensitivity passage 67. Finally, the minimum pressure unit also opens again.

It will be understood from the operation described that upon releasing the brake, high charging impulses having a duration equal to that of the brake releasing time (which may in position F, for example, be of the order of 45–50 seconds) can be applied without the reservoirs being overloaded, i. e., until the pressure in the brake cylinder has sunk to about 0.3 kg./cm.$^2$.

I claim:

1. A control system for automatic, single-chamber, compressed air brakes, comprising a maximum-pressure-limiting device containing a spring-actuated valve and a diaphragm, whereby the interior of said device is divided into at least first, second and third chambers, an accelerator containing a discharged-air and spring-actuated valve whereby the interior of said accelerator is divided into at least first and second chambers, a draw-off, restricting device containing a spring-actuated valve having two elements which open and close alternately, the interior of said draw-off, restricting device comprising at least first and second chambers, a header unit containing a diaphragm and an auxiliary-air and spring-actuated valve connected with the last-mentioned diaphragm, the interior of said header unit being divided by said diaphragm and said valve into at least first, second and third chambers, a cut-off unit containing a diaphragm-actuated valve, a minimum-pressure unit containing a valve, the interior of said minimum-pressure unit being divided into at least first and second chambers, the second chamber of said minimum-pressure unit being connected with the second chamber of said header unit, a charging unit containing a spring-loaded valve and a diaphragm connected therewith, whereby the interior of said charging unit is divided into at least first and second chambers, a triple-pressure, regulating unit containing a spring-actuated valve and diaphragms dividing it into at least first, second and third chambers, a brake cylinder, a main air pipe connected with the second chamber of said maximum-pressure-limiting device, an auxiliary air reservoir, a control-air reservoir, a discharge interrupter connected with the second chamber of said draw-off, restricting device, and the atmosphere, a second pipe connecting the second chamber of said maximum-pressure-limiting device with said cut-off unit, means connecting the first chamber of said maximum-pressure-limiting device with the first chamber of said charging unit, a third pipe connecting the third chamber of said maximum-pressure-limiting device with the second chamber of said charging unit, a fourth pipe connecting the first chamber of said charging unit with said control-air reservoir, a fifth pipe connecting the fourth-mentioned pipe with the first chamber of said triple-pressure, regulating unit, second means connecting the third chamber of said triple-pressure, regulating unit with said brake cylinder, a sixth pipe connecting the first chamber of said minimum-pressure unit with said brake cylinder, a seventh pipe connecting the first chamber of said header unit with said auxiliary air reservoir, an eighth pipe connecting the second chamber of said triple-pressure, regulating unit with the first chamber of said accelerator, a ninth pipe connecting the second chamber of said accelerator with the second chamber of said draw-off, restricting device, and a tenth pipe connecting the first chamber of said draw-off, restricting device with the third chamber of said header unit.

2. A control system according to claim 1, wherein said accelerator further contains a diaphragm which separates the first chamber of said accelerator from a third chamber, and which is adapted to engage and operate the spring-actuated valve of said accelerator, and an eleventh pipe connecting the third chamber of said accelerator with the seventh-mentioned pipe extending between said auxiliary air reservoir and the first chamber of said header unit, whereby the spring-actuated valve of said accelerator is actuated by the difference between main air pressure and auxiliary air pressure.

3. A control system according to claim 1, wherein said draw-off, restricting device further includes a diaphragm connected to the spring-actuated valve of the draw-off, restricting device and located in an additional chamber formed therein, and a twelfth pipe connecting said additional chamber of the draw-off, restricting device with the fourth-mentioned pipe, the alternate opening and closing of said two elements of the valve of said draw-off, restricting device being caused by the pressure difference between main air and control air.

4. A control system according to claim 1, wherein said discharge interruptor is connected with the second chamber of said draw-off, restricting device through a throttling passage of predetermined cross-section and includes a diaphragm and a valve connected therewith, whereby said discharge interruptor is divided into first and second chambers, the second chamber thereof of predetermined volume communicating with said throttling passage, while the first chamber is open to the atmosphere and is in communication with the second chamber of said draw-off, restricting device when the valve of the discharge interruptor is open, and a spring engaging the last-mentioned valve and adapted to hold it open during discharge.

5. A control system according to claim 4, comprising a thirteenth pipe connecting the first chamber of said accelerator with the first chamber of said draw-off, restricting device, and a fourteenth pipe connecting the first chamber of said accelerator with the second chamber of the maximum-pressure-limiting device.

6. A control system according to claim 5, wherein said cut-off unit includes two diaphragms connected with the valve of the cut-off unit, whereby the interior of said cut-off unit is divided into first, second and third chambers, and wherein said minimum-pressure unit includes a diaphragm connected with the valve of the minimum-pressure unit and a dividing wall located between the diaphragm and the valve, whereby at least one additional chamber is formed in the interior of said minimum-pressure unit, the valve of the minimum-pressure unit connecting the second chamber of said header unit with the first chamber of the minimum-pressure unit, a fifteenth pipe connecting the first chamber of the minimum-pressure unit with the third chamber of the cut-off unit, the second chamber of the cut-off unit and the additional chamber of the minimum-pressure unit being open to the atmosphere, a sixteenth pipe connecting the first chamber of said cut-off unit with the fourth-mentioned pipe, and third means connecting the second chamber of the charging unit with the auxiliary air reservoir, whereby the valve of the cut-off unit is adapted to interrupt the connection between the main air pipe and the auxiliary air reservoir or the control-air reservoir.

7. A control system according to claim 6, comprising a suction member located in the sixth-mentioned pipe, said minimum-pressure unit having a second additional chamber between the diaphragm and the dividing wall, and an eleventh pipe connecting the sixth-mentioned pipe with the second additional chamber of the minimum-pressure unit, said minimum-pressure unit containing a spring located in its first additional chamber and engaging the diaphragm thereof to maintain open the valve of the minimum-pressure unit.

8. A control system according to claim 6, wherein the third-mentioned pipe comprises a sensitivity-passage formed therein, and wherein the fourth-mentioned pipe comprises a throttling passage formed therein and located close to the inlet of said control-air reservoir, and wherein the spring of the spring-loaded valve of said charging unit is of such strength that pressure difference between main air and auxiliary air causes said spring-loaded valve to open during the charging of the empty reservoir from the main air line.

9. A control system according to claim 1, comprising a setting valve operatively connected with said triple-pressure, regulating unit and comprising two cooperating members movable relatively to each other, and a housing containing said members, one of said members having two passages formed therein for adjusting different pressure stages, the other one of said members having air-controlling passages for regulating charging and releasing times, and throttle sleeves for said passages, said throttle sleeves being dimensioned to provide required charging and releasing times.

10. A control system according to claim 1, wherein an additional chamber is formed in said charging unit between the valve and the diaphragm thereof and comprising an eighteenth pipe connecting said additional chamber with said auxiliary air reservoir, and wherein said triple-pressure, regulating unit has an additional chamber containing the spring-operated valve thereof, and means connecting the last-mentioned additional chamber with the eighteenth-mentioned pipe, whereby said auxiliary air reservoir is connected with the valve of the maximum-pressure-limiting device and the main air pipe, and wherein said maximum-pressure-limiting device includes a hollow valve rod and a diaphragm connected therewith, whereby an additional chamber is formed in said maximum-pressure-limiting device between said diaphragm and its valve, said hollow valve rod connecting said main air pipe with the additional chamber of said maximum-pressure-limiting device, the valve of the maximum-pressure-limiting device being operated by pressure difference between main air and control air.

11. A control system according to claim 1, wherein the second-mentioned means connecting the third chamber of said triple-pressure, regulating unit with said brake cylinder includes a charging time control unit having a throttling passage formed therein, a braking air pipe connecting said throttling passage with said brake cylinder, and a pipe connecting said charging time control unit with the third chamber of said triple-pressure, regulating unit.

12. In a compressed air brake in combination with a main air pipe normally having a predetermined operating pressure, and an air reservoir, normally charged to operating pressure; means connecting said main air pipe with the atmosphere and comprising a normally open first valve and a normally closed second valve, means connected with the first-mentioned valve and closing the first-mentioned valve when pressure in the main air pipe drops to a predetermined extent, pneumatic actuating means for the second-mentioned valve connected with said air reservoir and responsive to a drop of pressure in the main air pipe below the pressure in said air reservoir to open the second-mentioned valve, and means connected with the second-mentioned valve for holding it open until the first-mentioned valve is closed.

13. In a compressed air brake in combination with a main air pipe normally having a predetermined operating pressure, and an air reservoir normally charged to operating pressure; means constituting a communication connecting said main air pipe with the atmosphere and comprising a normally open first valve and a normally closed second valve, said second valve having a movable part, means connected with the first-mentioned valve and closing it when pressure in the main air pipe drops to a predetermined extent, pneumatic actuating means for the second-mentioned valve connected with said air reservoir and responsive to a drop of pressure in the main air pipe below the pressure in said air reservoir to open the second-mentioned valve; an element movably disposed in said communication means and connected with said movable part of the second mentioned valve, said element forming a narrowed passage in the communication means to hold the second mentioned valve open under the influence of the air flowing through the passage until the first-mentioned valve is closed.

14. In a compressed air brake in combination with a main air pipe normally having a predetermined operating pressure, an auxiliary air reservoir and a control-air reservoir both normally charged to operating pressure; means constituting a communication connecting said main air pipe with the atmosphere and comprising a normally open first valve and a normally closed second valve, actuating means for the first-mentioned valve subjected to opposing actions of pressures in the main air pipe and in the control-air reservoir to close the first-mentioned valve when pressure in the main air pipe drops to a predetermined extent; pneumatic actuating means for the second-mentioned valve connected with said auxiliary reservoir and responsive to a drop of pressure in the main air pipe below the pressure in the auxiliary air reservoir to open the second-mentioned valve; an element movably disposed in said communication means and connected with the second-mentioned valve, said element forming a narrowed passage in the communications means to hold the second-mentioned valve open under the influence of the air flowing through the passage until the first mentioned valve is closed.

15. In a compressed air brake in combination with a main air pipe, an air reservoir and a brake cylinder; communication means connecting said main air pipe with the atmosphere and comprising a pressure chamber and means for restricting the venting of compressed air from said pressure chamber to the atmosphere, valve means connected with the main air pipe for locally venting compressed air from the main air pipe; actuating means for said valve means connected with the main air pipe to hold said valve means normally closed; loading means for said actuating means to open said valve means upon a reduction of main air pipe pressure under the opposing effects of main air pipe pressure and of said loading means; a header unit comprising a normally closed valve connecting said air reservoir with the brake cylinder and comprising actuating means for said valve connected with said pressure chamber and responsive to the pressure in the latter to open the valve of said header unit by the compressed air vented from the main air pipe to provide a supply of compressed air from said air reservoir to the brake cylinder when pressure drops in the main air pipe; a control unit comprising a normally open first valve adapted to interrupt the flow of compressed air from said pressure chamber to the atmosphere, a second normally closed valve connecting the main air pipe with said pressure chamber, and actuating means for said first and second valves operating the latter two valves upon a drop of pressure of a predetermined amount in the main air pipe, to interrupt the venting of compressed air from the main air pipe by said first valve and to connect said actuating means of said header unit with the main air pipe.

16. In a compressed air brake having a brake cylinder, in combination, a triple valve having means regulating pressure in the brake cylinder in two different stages said means comprising a main actuating chamber and an auxiliary actuating chamber, means constituting a communication connecting said triple valve with the brake cylinder, adjustable means producing two different flow cross-sections in said communication, pneumatic actuating means for said adjustable means, said actuating means being connected with said auxiliary actuating chamber, valve means for selectively connecting said auxiliary actuating chamber and said actuating means with the main actuating chamber and the atmosphere, whereby the filling time period of the brake cylinder remains constant in both stages.

SIEGFRIED KELLER.

References Cited in the file of this patent
UNITED STATES PATENTS

| Number | Name | Date |
|---|---|---|
| 2,031,213 | Farmer | Feb. 18, 1936 |
| 2,088,185 | Borde | July 27, 1937 |
| 2,173,928 | Borde at al. | Sept. 26, 1937 |
| 2,094,173 | Jack | Sept. 28, 1937 |
| 2,278,700 | Kaleshin | Apr. 7, 1942 |